United States Patent
Nogami et al.

(10) Patent No.: US 11,385,208 B2
(45) Date of Patent: Jul. 12, 2022

(54) ANALYSIS DEVICE

(71) Applicant: Hitachi High-Technologies Corporation, Tokyo (JP)

(72) Inventors: Makoto Nogami, Tokyo (JP); Shinya Ito, Tokyo (JP)

(73) Assignee: Hitachi High-Tech Corporation, Tokyo (JP)

(*) Notice: Subject to any disclaimer, the term of this patent is extended or adjusted under 35 U.S.C. 154(b) by 752 days.

(21) Appl. No.: 16/083,308

(22) PCT Filed: Mar. 7, 2016

(86) PCT No.: PCT/JP2016/057020
§ 371 (c)(1),
(2) Date: Sep. 7, 2018

(87) PCT Pub. No.: WO2017/154083
PCT Pub. Date: Sep. 14, 2017

(65) Prior Publication Data
US 2020/0340957 A1    Oct. 29, 2020

(51) Int. Cl.
*G01N 30/20* (2006.01)
*G01N 30/38* (2006.01)
(Continued)

(52) U.S. Cl.
CPC ............. *G01N 30/20* (2013.01); *G01N 30/14* (2013.01); *G01N 30/28* (2013.01); *G01N 30/38* (2013.01);
(Continued)

(58) Field of Classification Search
CPC .. G01N 30/38; G01N 30/20; G01N 2030/385; G01N 2030/207
See application file for complete search history.

(56) References Cited

U.S. PATENT DOCUMENTS

| 6,558,946 B1 | 5/2003 | Krishnamurthy |
| 2010/0237235 A1 | 9/2010 | Ozbal et al. |

(Continued)

FOREIGN PATENT DOCUMENTS

| JP | 2002-214212 A | 7/2002 |
| JP | 2006-284469 A | 10/2006 |

(Continued)

OTHER PUBLICATIONS

International Preliminary Report on Patentability (PCT/IB/338 & PCT/IPEA/409) issued in PCT Application No. PCT/JP2016/057020 dated Sep. 7, 2018 (five pages).
(Continued)

*Primary Examiner* — Paul M. West
(74) *Attorney, Agent, or Firm* — Crowell & Moring LLP

(57) ABSTRACT

An analysis device of the present invention is provided with a sample introduction unit that introduces a sample into a mass spectroscope; a sample condensation unit that treats the sample introduced into the device; a detection unit that analyzes the sample treated by a treatment unit; and a control unit that controls the sample introduction unit, the sample condensation unit, and the detection unit. The sample introduction unit includes a sample introduction valve, and the sample condensation unit includes an elution valve and a cleaning valve, and the cleaning valve is disposed between the sample introduction valve and the elution valve.

7 Claims, 13 Drawing Sheets

(51) Int. Cl.
*G01N 30/14* (2006.01)
*G01N 30/28* (2006.01)
*G01N 30/72* (2006.01)
*G01N 30/32* (2006.01)

(52) U.S. Cl.
CPC ... *G01N 30/7233* (2013.01); *G01N 2030/207* (2013.01); *G01N 2030/326* (2013.01); *G01N 2030/328* (2013.01); *G01N 2030/385* (2013.01)

(56) References Cited

U.S. PATENT DOCUMENTS

| | | | | |
|---|---|---|---|---|
| 2012/0216632 | A1* | 8/2012 | Seki | G01N 30/16 73/863.01 |
| 2016/0195564 | A1* | 7/2016 | Hewitson | G01N 30/06 436/54 |
| 2017/0176400 | A1* | 6/2017 | Lee | G01N 30/20 |

FOREIGN PATENT DOCUMENTS

| | | |
|---|---|---|
| JP | 2011-503548 A | 1/2011 |
| JP | 4613279 A | 1/2011 |
| WO | WO 2005/048126 A2 | 5/2005 |
| WO | WO 2009/059286 A1 | 5/2009 |

OTHER PUBLICATIONS

International Search Report (PCT/ISA/210) issued in PCT Application No. PCT/JP2016/057020 dated May 24, 2016 with English translation (five (5) pages).

Japanese-language Written Opinion (PCT/ISA/237) issued in PCT Application No. PCT/JP2016/057020 dated May 24, 2016 with partial English translation (twelve (12) pages).

Extended European Search Report issued in counterpart European Application No. 16893415.6 dated Sep. 26, 2019 with English translation (seven (7) pages).

\* cited by examiner

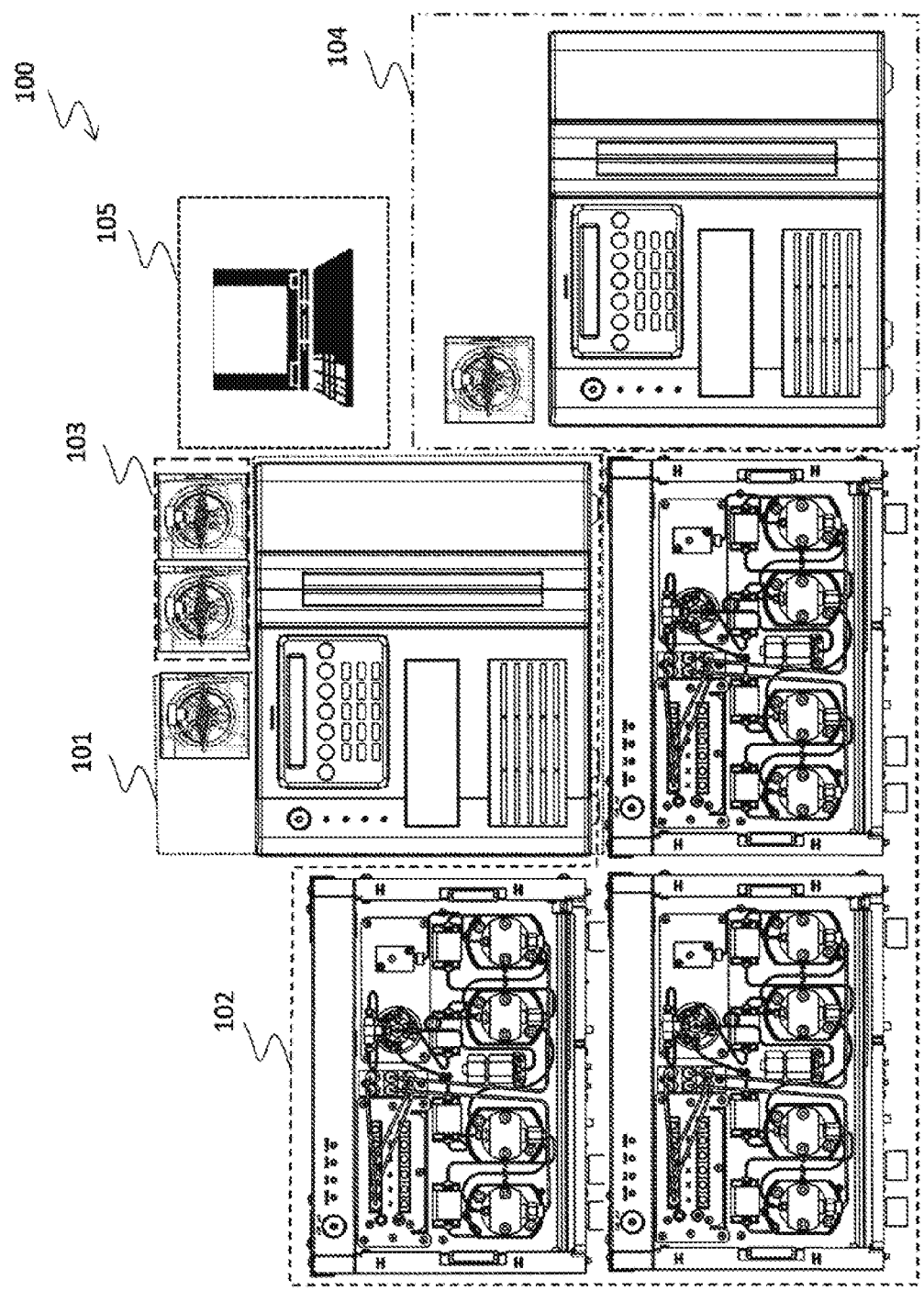

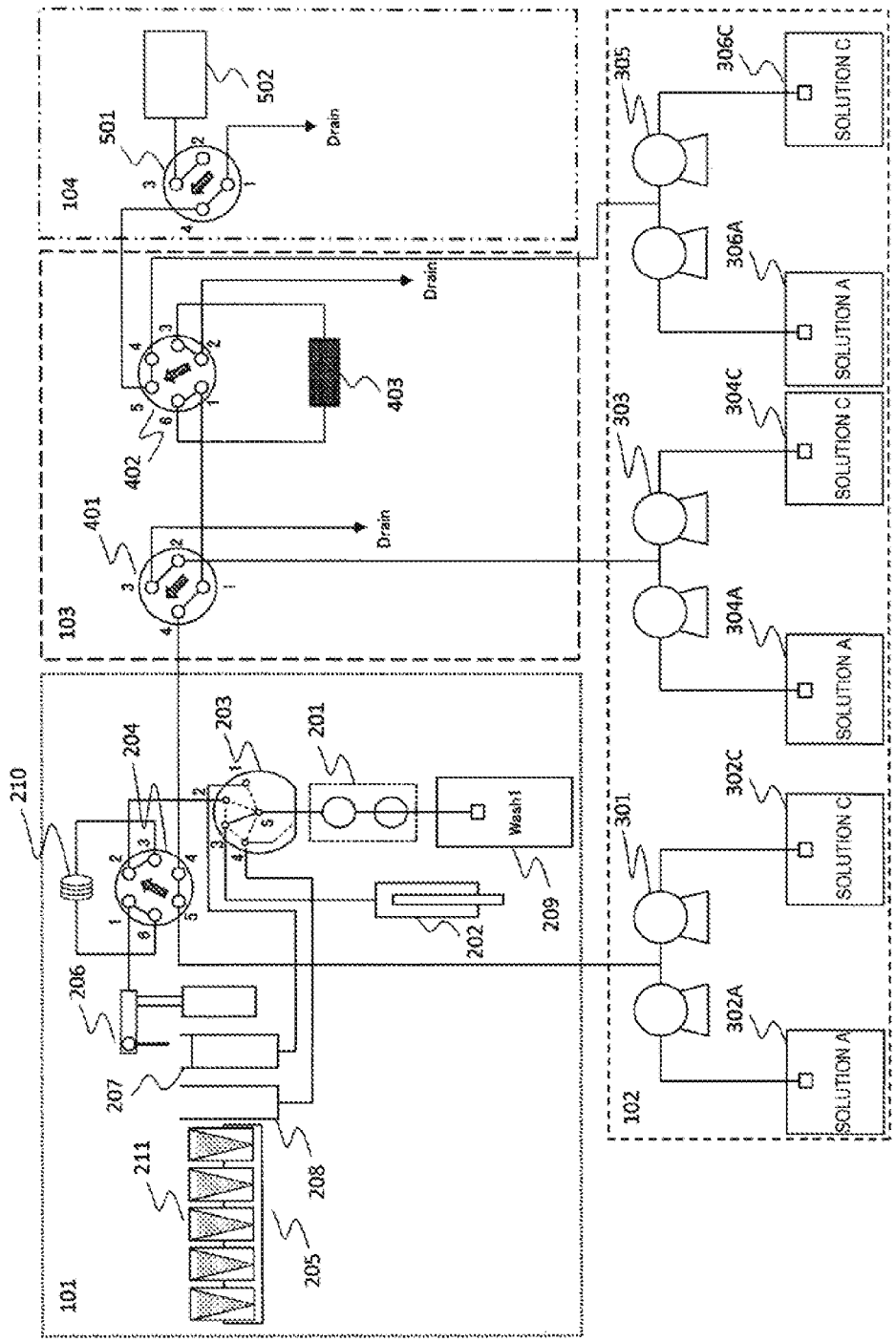
[FIG. 2]

[FIG. 3A]
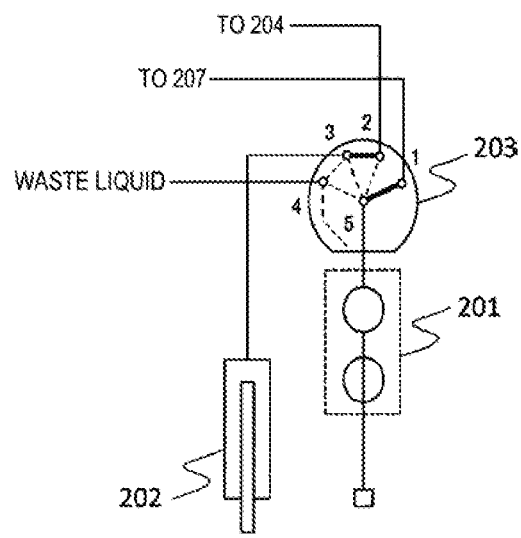
[FIG. 3B]
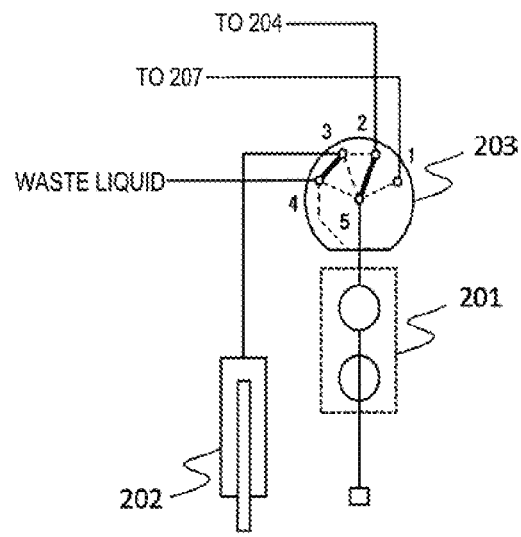

[FIG. 3C]
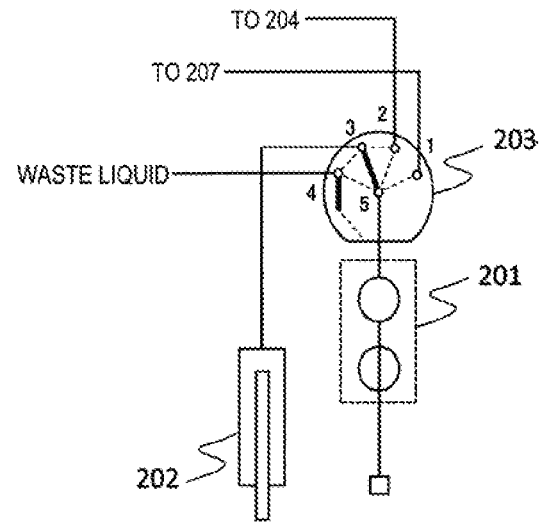
[FIG. 3D]
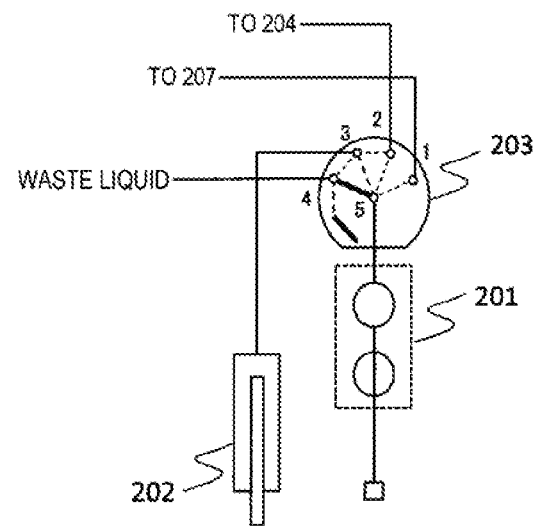

[FIG. 4A]
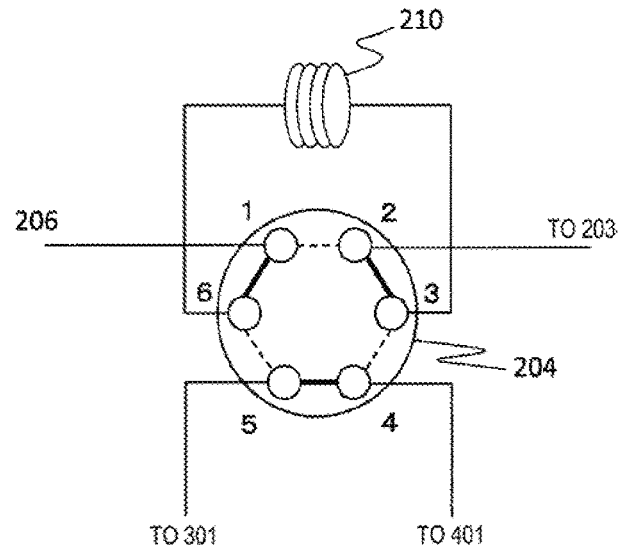
[FIG. 4B]
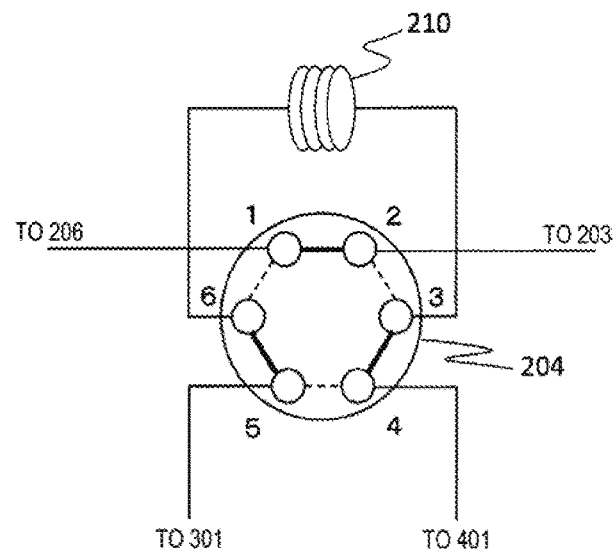
[FIG. 5A]
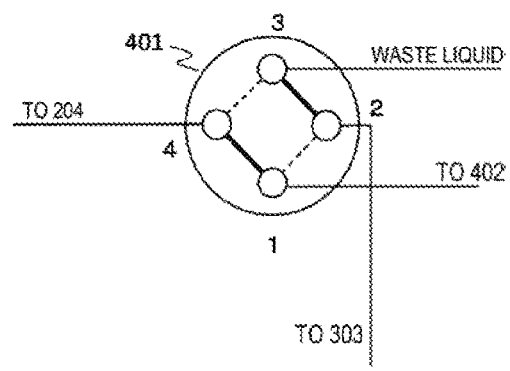

[FIG. 5B]
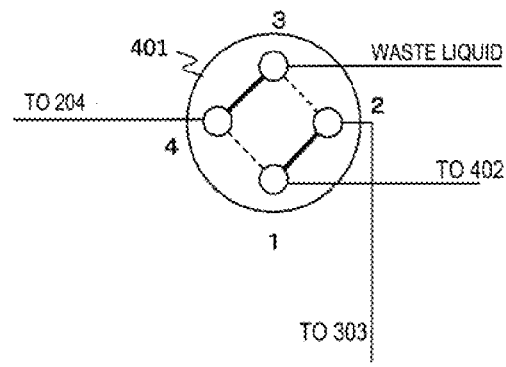
[FIG. 6A]
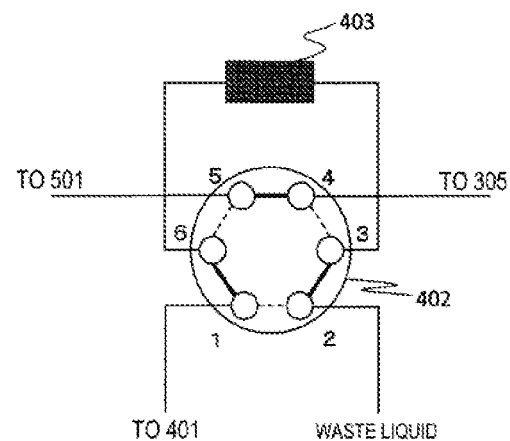
[FIG. 6B]
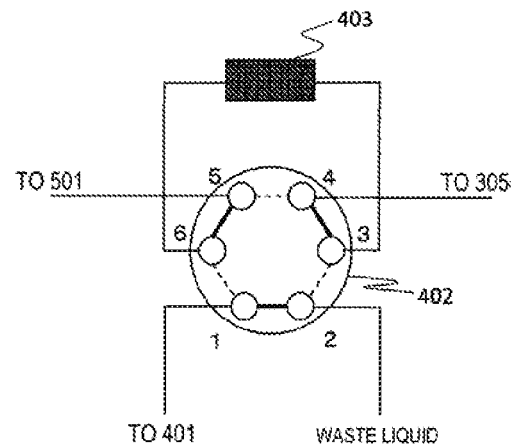

[FIG. 7A]
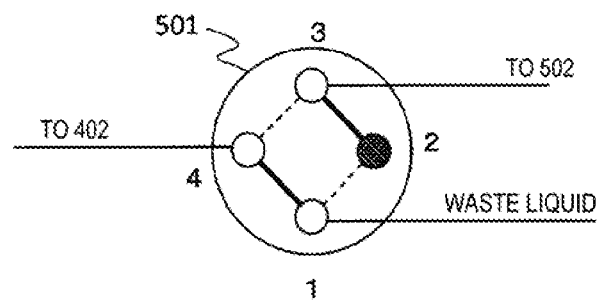
[FIG. 7B]
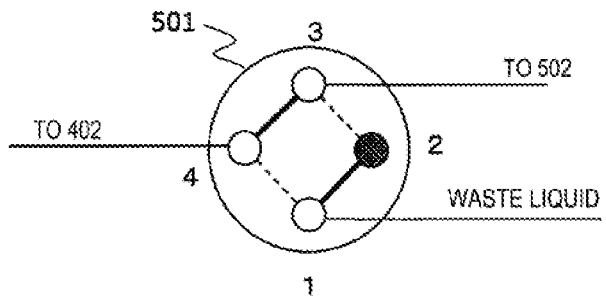

[FIG. 8]
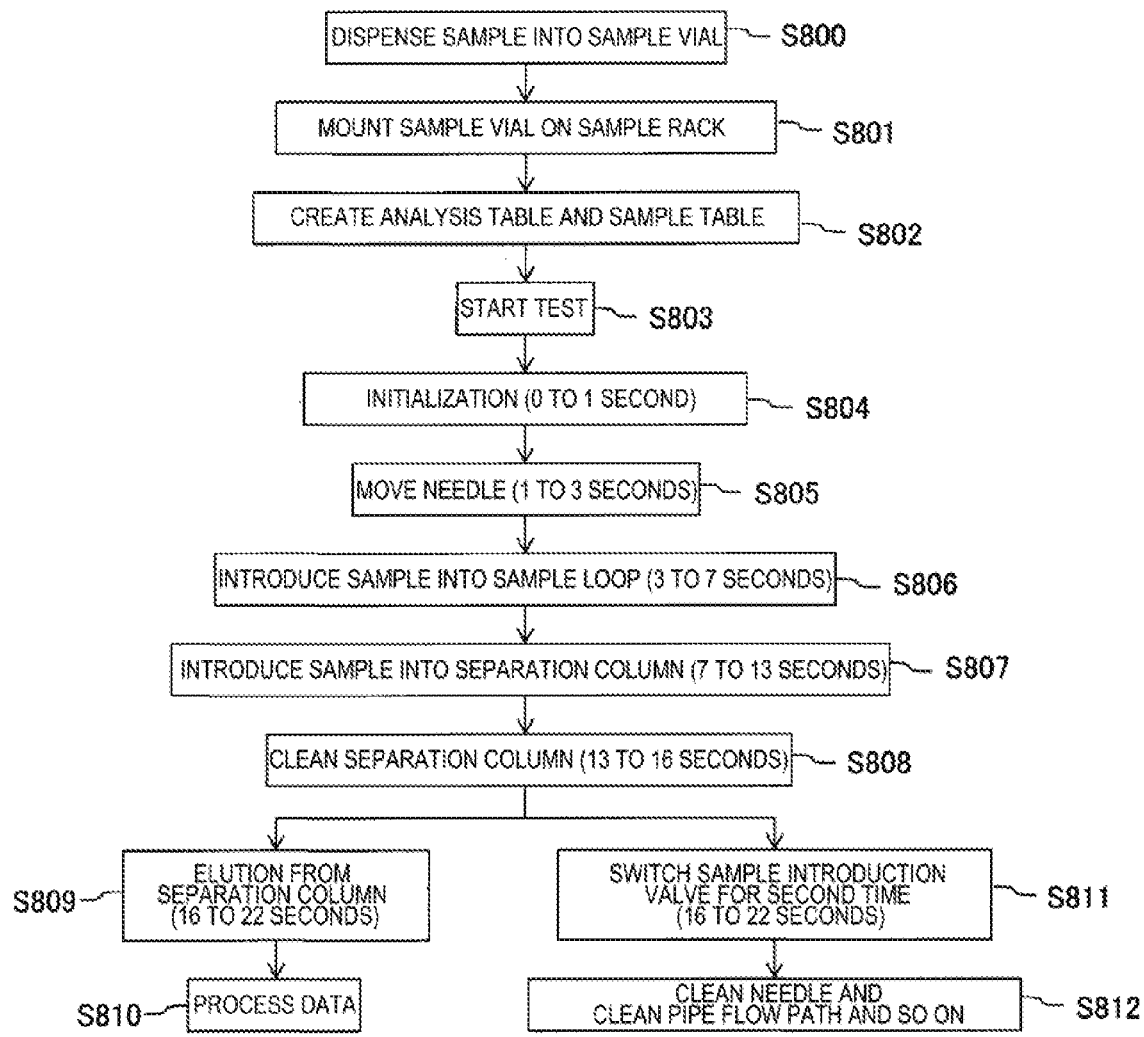

[FIG. 9]

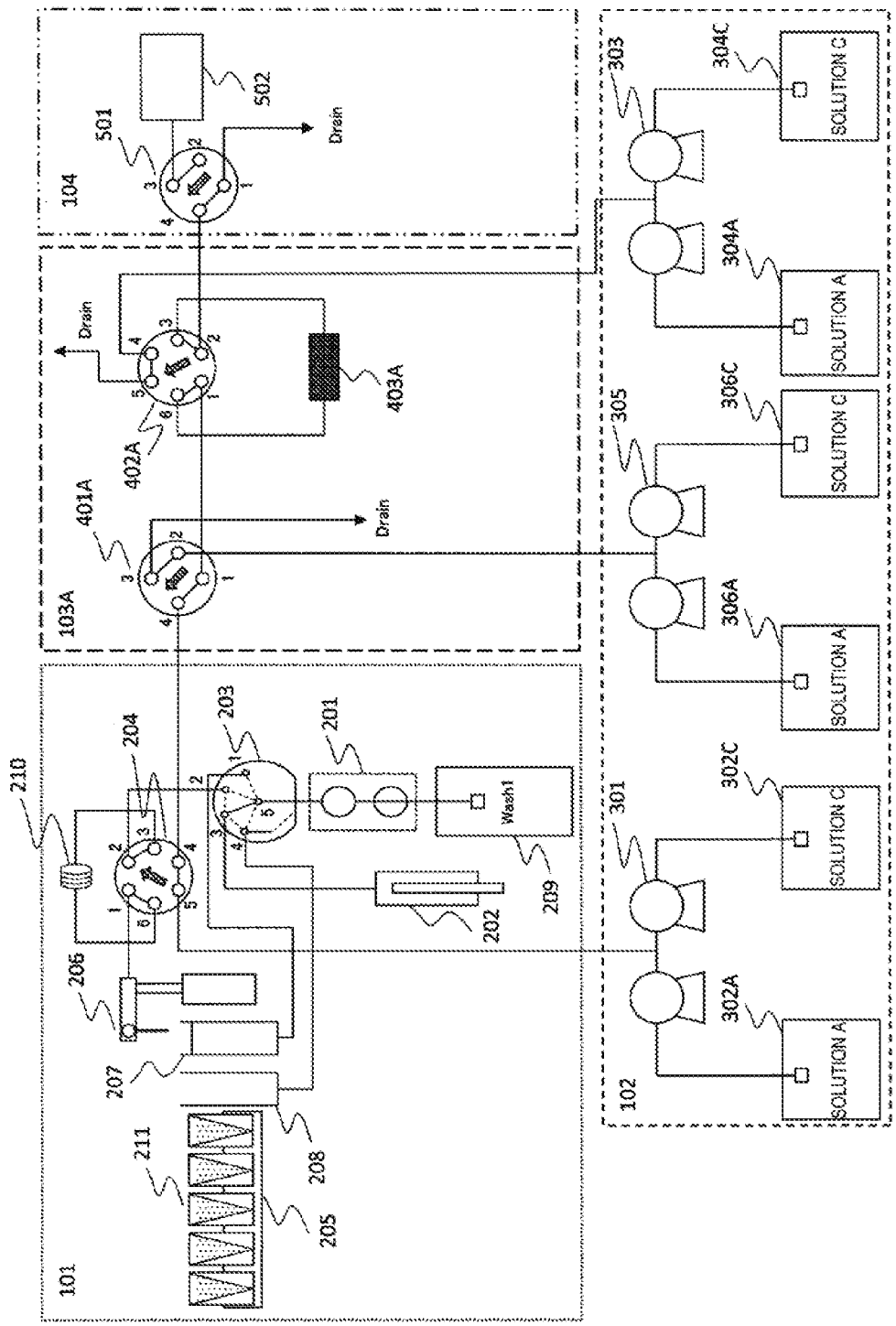
[FIG. 10]

[FIG. 11A]
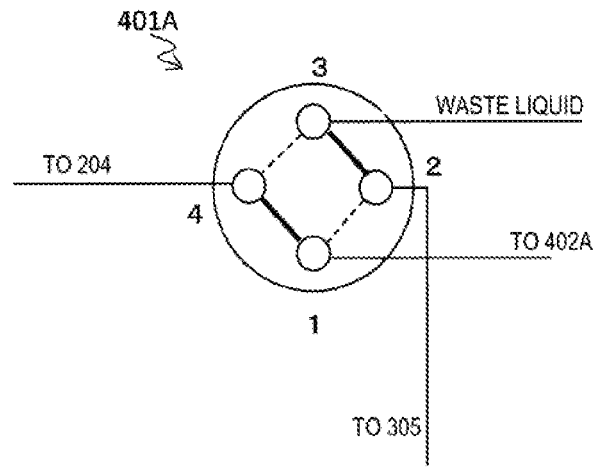
[FIG. 11B]
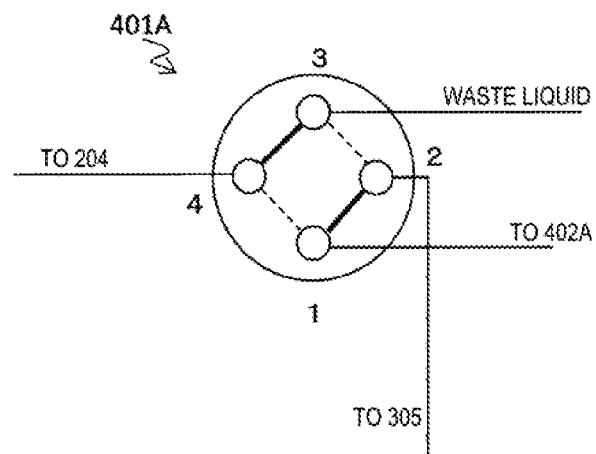
[FIG. 12A]
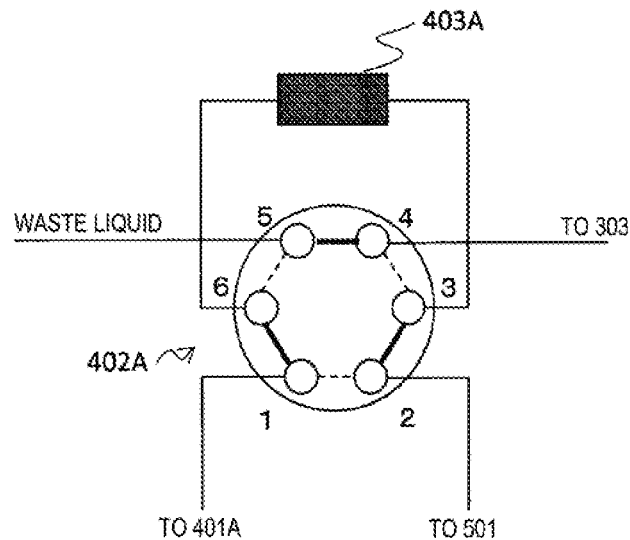

[FIG. 12B]
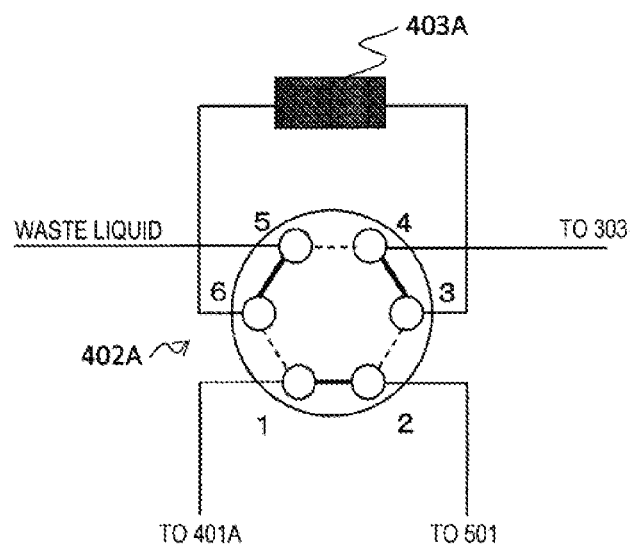

[FIG. 13]

ANALYSIS DEVICE

TECHNICAL FIELD

The present invention relates to an analysis device for quantifying an analyte.

BACKGROUND ART

PTL 1 discloses a technique for realizing high throughput analysis within 30 seconds.

PTL 1 discloses a system including two six-way valves, wherein a sample loop, a zipper, a vacuum trap, and a sample introduction pump are connected to a front six-way valve and, the system includes a mechanism of feeding a sample to a rear valve by switching a flow path of the front valve after the sample is introduced into the sample loop by a vacuum suction method. In addition, PTL 1 discloses that a column and a sample elution pump are connected to the rear valve and, after the sample is introduced into the column, the sample is fed to a sample analyzer on the rear side by switching the flow path of the rear valve. Thereafter, PTL 1 discloses that, when using a process of inversely eluting an eluate over an insoluble matrix in a direction opposite to the direction in which the sample is introduced to the column and outputting a sample containing an analyte, in order to output a plurality of samples at a periodic rate, processes for passing a fluid through and inversely eluting the eluate are repeated and a continuous flow of the eluate to the sample analyzer is maintained.

CITATION LIST

Patent Literature

PTL 1: Japanese Patent No. 4613279

SUMMARY OF INVENTION

Technical Problems

In the field of clinical diagnosis, applications of mass spectrometers are expanding as a test instrument. For this test instrument, high throughput, high accuracy, low carryover, easy maintenance, and low test fee are demanded as requests for equipment specifications from hospitals, testing companies, patients, and clinical laboratory technicians.

An immunoassay, which is a test instrument in the related art, has disadvantages such as high test cost due to the necessity of preparing antibodies using a component to be measured as an antigen, cross-reactivity with similar compounds like metabolites, nonspecific reaction of an antibody, and, most of all, inapplicability to the components to be measured which are not capable of producing antibodies. On the other hand, the selectivity and high sensitivity of a mass spectrometer, particularly, a triple quadrupole mass spectrometer can compensate for the shortcomings of immunoassays and is therefore expected as a new inspection instrument for clinical diagnosis.

When testing a patient specimen collected in the form of serum, plasma, or urine with a mass spectrometer, it is generally necessary to have a pre-treatment unit for pre-processing the sample. This is to improve accuracy of a test and to reduce the load on the mass spectrometer by separating contaminants from components to be measured.

Generally, after separation of components of a patient specimen by using liquid chromatography equipped with a solid phase extraction (SPE) column or a high performance liquid chromatography (HPLC) column as a pre-treatment unit, the components are introduced into a mass spectrometer.

A liquid chromatography includes an autosampler (automatic sample injector). A sample is sucked from a sample vial mounted on a sample rack by a needle suction method, and the sample is injected into an injection port of an injection valve to be introduced into the flow path system including a column. In the autosampler, a needle, an injection valve, an injection port, and a flow path pipe are thoroughly cleaned in order to reduce a carryover after introduction of a sample.

Here, in order to maintain the analysis accuracy of liquid chromatography, it is essential to clean and equilibrate a column, clean a flow path pipe and the like, and initialize a solution mixing ratio, and even a currently available high throughput device requires a throughput of 1 minute (60 seconds) or longer. However, since throughput greatly contributes to a test cost, a pre-treatment unit with a higher throughput is demanded.

In the vacuum suction method disclosed in PTL 1 described above, a sample is moved with a pressure state in a flow path pipe and introduced into a sample loop. However, the speed of the sample moving in the flow path pipe is not constant due to the physical properties (viscosity) of the sample. Therefore, it is necessary to introduce a large amount of sample into the flow path pipe before and after the sample loop, compared with an amount of the sample that is analyzed by a sample loop arranged at a front valve and actually introduced to a detector. Thereafter, by switching the flow path of the front valve, the sample is fed to a rear valve. In other words, there are a significant amount of the sample before and after the sample loop after being fed. Therefore, in the configuration disclosed in PTL 1, cleaning for a certain period of time is required after feeding a liquid. Therefore, it is difficult to perform an analysis with high throughput within 30 seconds, and it is required to further accelerate a cleaning process.

The present invention provides an analysis device capable of performing cleaning with a high throughput.

Solution to Problem

In order to solve the above problem, for example, the configurations described in the claims are employed.

The present invention includes a plurality of units for solving the above-mentioned problems. An example thereof is to provide an analysis device for quantifying an analyte, including: a sample introduction unit configured to introduce a sample into the analysis device; a treatment unit configured to treat the sample introduced into the analysis device at the sample introduction unit; a detection unit configured to analyze the sample treated at the treatment unit; and a control unit configured to control the sample introduction unit, the treatment unit, and the detection unit, wherein the sample introduction unit includes a sample introduction valve, the treatment unit includes an elution valve and a cleaning valve, and the sample introduction valve feeds the sample to the elution valve via the cleaning valve, and the detection unit analyzes the sample which flew thereto via the sample introduction valve, the cleaning valve and the elution valve in the order stated.

Advantageous Effects of the Invention

According to the present invention, there is provided an analysis device capable of performing cleaning with a high throughput. The problems, configurations, and effects other FIG. 13 is a time chart of a test in the mass spectroscope of the Embodiment 2.

BRIEF DESCRIPTION OF THE DRAWINGS

FIG. 1 is a schematic view of a mass spectroscope according to an Embodiment 1 of the present invention.

FIG. 2 is a schematic view of a flow path configuration of the mass spectroscope according to the Embodiment 1.

FIG. 3A is a schematic view of an example of the position of a syringe valve of the mass spectroscope of the Embodiment 1.

FIG. 3B is a schematic view of an example of the position of the syringe valve of the mass spectroscope of the Embodiment 1.

FIG. 3C is a schematic view of an example of the position of the syringe valve of the mass spectroscope of the Embodiment 1.

FIG. 3D is a schematic view of an example of the position of the syringe valve of the mass spectroscope of the Embodiment 1.

FIG. 4A is a schematic view of an example of the position of a sample introduction valve of the mass spectroscope of the Embodiment 1.

FIG. 4B is a schematic view of an example of the position of the sample introduction valve of the mass spectroscope of the Embodiment 1.

FIG. 5A is a schematic view of an example of the position of a cleaning valve of the mass spectroscope of the Embodiment 1.

FIG. 5B is a schematic view of an example of the position of the cleaning valve of the mass spectroscope of the Embodiment 1.

FIG. 6A is a schematic view of an example of the position of an elution valve of the mass spectroscope of the Embodiment 1.

FIG. 6B is a schematic view of an example of the position of the elution valve of the mass spectroscope of the Embodiment 1.

FIG. 7A is a schematic view of an example of the position of a waste liquid valve of the mass spectroscope of the Embodiment 1.

FIG. 7B is a schematic view of an example of the position of the waste liquid valve of the mass spectroscope of the Embodiment 1.

FIG. 8 is a flowchart of a test method in the mass spectroscope of the Embodiment 1.

FIG. 9 is a time chart of a test in the mass spectroscope of the Embodiment 1.

FIG. 10 is a schematic view of the flow path configuration of a mass spectroscope according to an Embodiment 2 of the present invention.

FIG. 11A is a schematic view of an example of the position of a cleaning valve of the mass spectroscope of the Embodiment 2.

FIG. 11B is a schematic view of an example of the position of a cleaning valve of the mass spectroscope of the Embodiment 2.

FIG. 12A is a schematic view of an example of the position of an elution valve of the mass spectroscope of the Embodiment 2.

FIG. 12B is a schematic view of an example of the position of the elution valve of the mass spectroscope of the Embodiment 2.

DESCRIPTION OF EMBODIMENTS

Hereinafter, embodiments of an analysis device according to the present invention will be described in detail with reference to the drawings, taking a mass spectroscope as an example. In all drawings for explaining this embodiment, in principle, those having the same mechanism are denoted by the same reference numerals, and repetitive descriptions thereof will be omitted as much as possible.

Embodiment 1

An Embodiment 1 of a mass spectroscope according to the present invention will be described with reference to FIGS. 1 to 9.

FIG. 1 is a schematic view of the mass spectroscope according to the present embodiment, FIG. 2 is a schematic view illustrating a flow path configuration of the mass spectroscope, FIGS. 3A to 3D are schematic views illustrating positions of a syringe valve, FIGS. 4A and 4B are schematic views illustrating positions of a sample introduction valve, FIGS. 5A and 5B are schematic views illustrating positions of a cleaning valve, FIGS. 6A and 6B are schematic diagrams illustrating positions of an elution valve, FIGS. 7A and 7B are schematic views illustrating positions of a waste liquid valve, FIG. 8 is a flowchart of a test method, and FIG. 9 is a time chart of a test.

<Overall Configuration of Device>

The configuration of the mass spectroscope will be described with reference to FIG. 1. As illustrated in FIG. 1, a mass spectroscope 100 is a device for quantifying the concentration of a predetermined component in a sample, which is an analyte, and includes a sample introduction unit 101, a liquid feeding unit 102, a sample condensation unit (treatment unit) 103, a detection unit 104, and a control unit 105.

A sample in the present invention is a patient specimen and refers to a biological specimen, such as serum, plasma, whole blood, urine, saliva, cellular tissue, and the like.

<Sample Introduction Unit>

Next, the sample introduction unit 101 will be described below with reference to FIG. 2. As illustrated in FIG. 2, the sample introduction unit 101 is a device for introducing a sample into the mass spectroscope and includes a pump 201, a syringe 202, a syringe valve 203, a sample introduction valve 204, a needle 206, a needle cleaning port 207, a waste liquid port 208, and a sample loop 210, wherein the respective components are connected to one another via a flow path pipe.

A diaphragm pump is used as the pump 201 and is connected to the syringe valve 203 via the flow path pipe. The solution is transferred from a reagent bottle 209 to the pump 201. This solution is used for cleaning the flow path pipe in the sample introduction unit 201, the needle 206, and the syringe 202, and is isopropanol or the like, for example. Cleaning may be performed with a combination of a plurality of types of solutions for improved cleaning effect. In such a case, a device configuration in which an electromagnetic valve is installed between the reagent bottle 209 and the flow path pipe of the pump 201 and the type of a solution can be changed by switching the electromagnetic valve may be possible.

Flow path switching of the syringe valve 203 will be described with reference to FIGS. 3A to 3D. As illustrated in FIGS. 3A to 3D, the syringe valve 203 is a five-way valve having five ports, and, by switching the position of the syringe valve 203, four flow paths can be changed. Inside the syringe valve 203, each of ports 1 to 4 can be connected to a port 5, ports 2 and 3 can be connected to each other, and ports 3 and 4 can also be connected to each other. The port 1 of the syringe valve 203 is connected to the needle cleaning port 207, the port 2 is connected to the sample introduction valve 204, the port 3 is connected to the syringe 202, the port 4 is connected to the waste liquid port 208, and the port 5 is connected to the pump 201.

Specifically, in the syringe valve 203, at the position illustrated in FIG. 3A, the port 5 and the port 1 are connected to each other, and the port 3 and the port 2 are connected to each other. At the position illustrated in FIG. 3B, the port 5 and the port 2 are connected to each other, and the port 3 and the port 4 are connected to each other. At the position illustrated in FIG. 3C, the port 5 and the port 3 are connected to each other. At the position illustrated in FIG. 3D, the port 5 and the port 4 are connected to each other.

Returning to FIG. 2, the sample introduction valve 204 is a six-way valve having six ports and includes a valve case, a rotor seal, a case spacer, and a stator. A narrow groove is cut-formed in the rotor seal and, when an external signal is received, the rotor seal appropriately rotates and switches between a position 1 and a position 2, thereby changing a flow path. A port 1 of the sample introduction valve 204 is connected to a needle 206, a port 2 is connected to the port 2 of the syringe valve 203, a port 3 and a port 6 are connected to the flow pipe that becomes the sample loop 210, a port 4 is connected to the sample condensation unit 103, and a port 5 is connected to a sample introduction pump 301 of the liquid feeding unit 102.

Flow path switching of the sample introduction valve 204 will be described with reference to FIGS. 4A and 4B. As illustrated in FIG. 4A, when the sample introduction valve 204 is positioned at a position 1, the port 1 and the port 6 are connected to each other, the port 2 and the port 3 are connected to each other, and the port 4 and the port 5 are connected to each other. As illustrated in FIG. 4B, when the sample introduction valve 204 is positioned at a position 2, the port 1 and the port 2 are connected to each other, the port 3 and the port 4 are connected to each other, and the port 5 and the port 6 are connected to each other.

The definition of a valve in the present embodiment is a part having a function of switching the flow path by being installed at an arbitrary position in the flow path of the device.

The sample loop 210 is a pipe that stores a sample sucked out from a sample vial 211 on a sample rack 205 through the needle 206.

The needle 206 moves over the sample rack 205 along the X-Y-Z axes and sucks a sample from the sample vial 211. When a sample is sucked by the needle 206, the position of the sample introduction valve 204 is switched to the position 1, and a flow path connecting the port 2 and the port 3 of the syringe valve 203 is formed (the state illustrated in FIG. 3A). In other words, the syringe 202, the sample loop 210, and the needle 206 are connected to one another via the sample introduction valve 204, the sample is sucked as the syringe 202 moves a set distance, and the sample moves in the flow path pipe from the sample vial 211 and fills the sample loop 210. Next, by switching the position of the sample introduction valve 204 to the position 2, the sample introduction pump 301 of the liquid feeding unit 102, the sample loop 210, and the cleaning valve 401 of the sample condensation unit 103 are connected to one another, and the sample filling the sample loop 210 is fed to the sample condensation unit 103.

<Liquid Feeding Unit>

Next, the liquid feeding unit 102 will be described. As illustrated in FIG. 2, the liquid feeding unit 102 is a device for feeding a solution to the sample introduction unit 101 or the sample condensation unit 103 and includes the sample introduction pump 301, a cleaning pump 303 and an elution pump 305. The cleaning pump 303 is connected to the cleaning valve 401 described below, the sample introduction pump 301 is connected to the sample introduction valve 204, and the elution pump 305 is connected to an elution valve 402.

Each pump includes a double plunger type pump with two extruding portions. Two double plunger type pumps are connected to each other via a mixer as a connecting pipe, and the rear end of the mixer becomes one flow path pipe. The definition of a mixer in the present invention is a structure capable of efficient mixing solutions as a plurality of solutions flow in the mixer.

Two reagent bottles 302A and 302C, two reagent bottles 304A and 304C, or two reagent bottles 306A and 306C are connected to each pump. Gradient analysis may be performed by controlling a flow rate and changing a solution mixing ratio.

In the present embodiment, a double plunger type pump is used. However, a single plunger type pump, a diaphragm pump, or a peristaltic pump can also be used as an extruding portion of a pump.

<Sample Condensation Unit>

Next, the sample condensation unit 103 will be described. As illustrated in FIG. 2, the sample condensation unit 103 is a device for processing a sample introduced into a device and includes the cleaning valve 401, the elution valve 402, and a separation column 403, which are connected to one another via flow path pipes.

As illustrated in FIG. 2, the cleaning valve 401 is a four-way valve having four ports and includes a valve case, a rotor seal, a case spacer, and a stator. A narrow groove is cut-formed in the rotor seal and, when an external signal is received, the rotor seal appropriately rotates and switches between a position 1 and a position 2, thereby changing a flow path. A port 1 of the cleaning valve 401 is connected to a port 1 of the elution valve 402, a port 2 is connected to the cleaning pump 303 of the liquid feeding unit 102, a port 3 is connected to a waste liquid port (not illustrated), and a port 4 is connected to the port 4 of the sample introduction valve 204.

Flow path switching of the cleaning valve 401 will be described with reference to FIGS. 5A and 5B. As illustrated in FIG. 5A, when the cleaning valve 401 is positioned at a position 1, the port 1 and the port 4 are connected to each other, and the port 2 and the port 3 are connected to each other. As illustrated in FIG. 5B, when the cleaning valve 401 is positioned at a position 2, the port 1 and the port 2 are connected to each other, and the port 3 and the port 4 are connected to each other.

Returning to FIG. 2, the elution valve 402 is a six-way valve having six ports and includes a valve case, a rotor seal, a case spacer, and a stator. A narrow groove is cut-formed in the rotor seal and, when an external signal is received, the rotor seal appropriately rotates and switches between a position 1 and a position 2, thereby changing a flow path. A port 1 of the elution valve 402 is connected to the port 1 of the cleaning valve 401, a port 2 is connected to a waste liquid port (not illustrated), a port 3 and a port 6 are connected to the separation column 403, a port 4 is connected to the elution pump 305 of the liquid sending part 102, and a port 5 is connected to a port 4 of a waste liquid valve 501 of the detection unit 104.

Flow path switching of the elution valve 402 will be described with reference to FIGS. 6A and 6B. As illustrated in FIG. 6A, when the elution valve 402 is positioned at a position 1, the port 1 and the port 6 are connected to each other, the port 2 and the port 3 are connected to each other, and the port 4 and the port 5 are connected to each other. As illustrated in FIG. 6B, when the elution valve 402 is positioned at a position 2, the port 1 and the port 2 are connected to each other, the port 3 and the port 4 are connected to each other, and the port 5 and the port 6 are connected to each other.

The separation column 403 is a column for separating components to be measured and impurities by utilizing the phenomenon that solutes contained in a solution or a suspension (mobile phase) are adsorbed in accordance with their affinity or flow while flowing through the separation column 403. In the present embodiment, a C18 column packed with packing obtained by chemically bonding an octadecylsilyl group to a silica gel carrier is used. The separation mode of the separation column 403 is not limited to a reversed phase column C18, and may be a reversed phase column C8 or C4, a normal phase column, a HILIC column, a cation exchange column, an anion exchange column, an amide column, a cyano column, a molecular weight cut-off column, or a PFP column.

<Detection Unit>

Next, the detection unit 104 will be described. As illustrated in FIG. 2, the detection unit 104 is a device for analyzing a sample treated by the sample condensation unit 103 and includes the waste liquid valve 501 and a detector 502.

The waste liquid valve 501 is disposed between the detector 502 and the elution valve 402 and is a four-way valve having four ports. The waste liquid valve 501 also includes a valve case, a rotor seal, a case spacer, and a stator. A narrow groove is cut-formed in the rotor seal and, when an external signal is received, the rotor seal appropriately rotates and switches between a position 1 and a position 2, thereby changing a flow path. A port 1 of waste liquid valve 501 is connected to a waste liquid port (not illustrated), a port 2 is tightly capped, a port 3 is connected to detector 502, and a port 4 is connected to the position 2 of the elution valve 402.

Flow path switching of the waste liquid valve 501 will be described with reference to FIGS. 7A and 7B. As illustrated in FIG. 7A, when the waste liquid valve 501 is positioned at a position 1, the port 1 and the port 4 are connected to each other. As illustrated in FIG. 7B, when the waste liquid valve 501 is positioned at a position 2, the port 3 and the port 4 are connected to each other.

The detector 502 includes an ion source which ionizes components to be measured by applying heat of a high temperature and a high voltage thereto and a mass spectrometer. In the present embodiment, a method of ionizing component to be measured at the ion source is electrospray ionization (ESI). Examples of other ionization methods include atmospheric pressure chemical ionization (APCI), atmospheric pressure chemical ionization (APCI), and the like. In the present embodiment, the mass spectrometer analyzes components to be measured by using a triple quadrupole mass spectrometer in a selected reaction monitoring (SRM) mode. Other types of mass spectrometer, such as a quadrupole mass spectrometer and an ion-trapping type mass spectrometer, may also be used.

In addition to those stated above, an ultraviolet (UV) detector, a diode array detector (DAD), a nuclear magnetic resonance (NMR) detector, an infrared absorption spectrometry (IR) detector, a Raman spectrometer, or the like may be used as the detector 502.

<Control Unit>

Next, the control unit 105 will be described. The control unit 105 controls the operations of parts (for example, valves, pumps, and the like) constituting the sample introduction unit 101, the liquid feeding unit 102, the sample condensation unit 103, and the detection unit 104 and includes a computer for calculating the concentration of a predetermined component in a sample from a result of detection by the detector 502. In particular, the control unit 105 of the present embodiment performs a control for switching the cleaning valve 401 so as to clean the sample condensation unit 103 even while a sample is being introduced into a device at the sample introduction unit 101. Furthermore, while a sample is being eluted from the sample condensation unit 103 to the detection unit 104, the control unit 105 performs a control for switching the sample introduction valve 204 back and forth one time.

The control unit 105 includes an analysis table and a sample table, and a test is performed according to an input analysis table and an input sample table. The analysis table is provided for each component to be measured and is stored in the control unit 105 in advance. In the analysis table, information about parameters of the sample introduction unit 101, the liquid transfer unit 102, the sample condensation unit 103, and the detection unit 104 are set and stored for each component to be measured. Components to be measured, positions of racks for the sample vial 211, and the number of times of suctions may be input to the sample table, and a linked analysis table is read and the a test is performed for each component to be measured. In the control unit 105, it is also possible to test a plurality of components to be measured at a same time for one sample. In this case, an analysis table for a case of testing a plurality of components to be measured is stored in the control unit 105 in advance, and a test can be performed by reading the analysis table. In addition, similar to a general clinical testing apparatus, a sample that needs to be urgently tested can be introduced even after a test started, and a re-examination can be performed based on a pre-set threshold of a test result. In such cases, the control unit 105 can adjust a test sequence to minimize a test time and perform a corresponding test.

<Test Method>

Next, as a typical analysis example according to the present invention, a test method in case where testosterone is a component to be measured will be described with reference to FIGS. 8 and 9. In the present embodiment, testosterone (molecular weight=288.1 Da) is used as a component to be measured, and testosterone-d3 (molecular weight=291.1 Da) is used as an internal standard material.

It should be noted that the mass spectroscope 100 according to the present embodiment can use a general clinical test article, such as a low molecular compound present in a sample, as a component to be measured other than testosterone. Other than low molecular weight compounds, components to be measured may also include peptides, proteins, deoxyribo nucleic acid (DNA), ribonucleic acid (RNA), and the like.

As illustrated in FIG. 8, as a preparation, a sample is dispensed into the sample vial 211 (step S800) and mounted on the sample rack 205 (step S801). Next, an internal standard material is added thereto. In the present embodiment, a case where the dispensing of the sample into the sample vial 211, the mounting of the sample vial 211 on the sample rack 205, and the addition of the internal standard material are manually performed is exemplified. However, the steps can also be automatically performed by using an automated device like a specimen transporting device.

(Before Test Start)

Next, at the control unit 105, a sample table is created by inputting components to be measured, location of the sample vial 211, a suction amount, and the number of times for performing suctions (step S802), and an analysis is started thereafter (step S803).

(Test Start; Initialization (0-1 second): step S804)

Simultaneously as the test starts, the control unit 105 performs initialization. During the initialization, signals are transmitted to and received from the control unit 105, and respective components in a device, a needle, the position of each valve, and the status of each pump are checked. The Initialization is set to be performed for 1 second (total time 1 second).

When each component is moving from an initial position, a signal is transmitted to and received from the control unit 105, and the component is returned to an initial position. As illustrated in FIG. 9, each of the sample introduction valve 204, the elution valve 402, and the waste liquid valve 501 are at a position 1 during the initialization (total time: from 0 to 1 second). During the initialization (total time: from 0 to 1 second), the cleaning valve 401 is at a position 2.

During the initialization, the sample introduction pump 301, the cleaning pump 303, and the elution pump 305 are initialized to solution mixing ratios based on the analysis table. In the present embodiment, as solutions used in the sample introduction pump 301, the cleaning pump 303, and the elution pump 305, 0.1% formic acid and 1 mmol/L ammonium formate aqueous solution are used for reagent bottles 302A, 304A, and 306A, and acetonitrile solution containing 0.1% formic acid and 1 mmol/L ammonium formate is used for reagent bottles 302C, 304C, and 306C. As illustrated in FIG. 9, the solution mixture ratio used at the sample introduction pump 301 during the initialization is solution A:solution C=100%:0%. The solution mixture ratio used at the cleaning pump 303 is solution A:solution C=0%:100%. The solution mixture ratio used at the elution pump 305 is solution A:solution C=0%:100%.

(Movement of Needle 206 (from 1 to 3 Seconds): Step S805)

Next, the sample is introduced to the sample loop 210. The needle 206 moves to the position of the sample vial 211 set in the sample table. As illustrated in FIG. 9, the needle 206 is configured to move for 2 seconds (total time: 3 seconds). When the needle 206 moves to a set position, as illustrated in FIG. 9, the control unit 105 transmits a start signal to a pump unit including the pump 201, the sample introduction pump 301, the cleaning pump 303, and the elution pump 305. When the start signal is received, the sample introduction pump 301, the cleaning pump 303, and the elution pump 305 start a gradient program.

During the gradient program, as illustrated in FIG. 9, the solution mixture ratio of the sample introduction pump 301 at the beginning of the gradient program is solution A:solution C=100:0. After the separation column 403 is cleaned as described below, the solution mixture ratio becomes solution A:solution C=0:100 and, after completion of the test, the solution mixture ratio becomes solution A:solution C=100:0. The solution mixing ratio of the cleaning pump 303 at the beginning of the gradient program is solution A:solution C=100:0. The solution mixing ratio after the separation column 403 is cleaned is solution A:solution C=0:100, and, even after the test is completed, the solution mixing ratio is maintained to solution A:solution C=0:100. The solution mixing ratio of the elution pump 305 at the beginning of the gradient program is solution A:solution C=100:0. The solution mixing ratio is linearly gradated from a solution mixing ratio of solution A:solution C=100:0 to a solution mixing ratio of solution A:solution C=0:100 from a time point at which the separation column 403 is cleaned to a time point after elution, and the solution mixing ratio from the time point after elution to a time point after completion of the test is maintained to solution A:solution C=0:100.

(Introduction of Sample into Sample Loop 210 (from 3 to 7 Seconds): Step S806)

Next, the sample is introduced to the sample loop 210 as the syringe 202 moves. The sample passes through the sample vial 211, the needle 206, and a flow path pipe, and the sample is introduced into the sample loop 210. It is configured to perform the introduction of the sample for 4 seconds (total time: 7 seconds). When the syringe 202 moves to a set position, as illustrated in FIG. 9, the control unit 105 transmits a start signal to a valve unit including the sample introduction valve 204, the cleaning valve 401, the elution valve 402, and the waste liquid valve 501 and the detector 502.

(Introduction of Sample into Separation Column 403 (from 7 to 13 Seconds): Step S807)

When a start signal is received in step S806 above, as illustrated in FIG. 9, the positions of the sample introduction valve 204 and the cleaning valve 401 are changed. The sample introduction valve 204 is switched from the position 1 to the position 2, the cleaning valve 401 is switched from the position 2 to the position 1, the sample introduction pump 301, the sample loop 210, and the cleaning valve 401 are connected to one another via the sample introduction valve 204, and the sample inside the sample loop 210 Is fed to the cleaning valve 401. At this time, since the cleaning valve 401 and the elution valve 402 are at the position 1, the sample is absorbed by the separation column 403. It is configured to perform the introduction of the sample into the separation column 403 for 6 seconds (total time: 13 seconds).

(Cleaning of Separation Column 403 (from 13 to 16 Seconds): Step S808)

Next, as illustrated in FIG. 9, the position of the cleaning valve 401 is switched from the position 1 to the position 2, the separation column 403 is connected to the cleaning pump 303 and the elution pump 402 via the cleaning valve 401, and the solution A is fed to the elution valve 402. At that time, since the elution valve 402 is still at the position 1, the solution A is fed in a direction same as a direction in which the sample is introduced to the separation column 403, and contaminants other than the component to be measured (testosterone in the present embodiment), such as phospholipids, salts, and the like, absorbed to the separation column 403 are cleaned. It is configured that the separation column 403 is cleaned for 3 seconds (total time: 16 seconds).

(Elution from Separation Column 403 (from 16 to 22 Seconds): Step S809)

Next, as illustrated in FIG. 9, the positions of the elution valve 402 and the waste liquid valve 501 are switched from the position 1 to the position 2, and the elution pump 305, the separation column 403, and the detector 502 are connected to one another via the elution valve 402 and the waste liquid valve 501. As described above, in the gradient program from the elution pump 305, the solution mixing ratio starts to be changed when the position of the elution valve 402 is switched to the position 2 (total time: 16 seconds), and a gradient program from the solution mixing ratio of solution A:solution C=100:0 (total time: 16 seconds) to the solution mixing ratio of solution A:solution C=0:100 (total time: from 21.9 to 22.0 seconds) is carried out. The solution from the elution pump 305 is fed to the separation column 403 in a direction opposite to the direction in which the sample is introduced to the separation column 403. It is configured that the elution of the sample occurs for 6 seconds (total time: 22 seconds).

(Second Time Switching of Sample Introduction Valve (16-22 Seconds): Step S811)

At the same timing as the elution from the separation column 403 in step S809, as illustrated in FIG. 9, simultaneously as the elution valve 402 and the waste liquid valve 501 are positioned at the position 2, the position of the sample introduction valve 204 is switched to the position 1 (total time: 16 seconds). Then, after 3 seconds (total time: 19 seconds), the position of the sample introduction valve 204 is switched to the position 2.

The reason that the position of the sample introduction valve 204 is switched back and forth twice during one analysis, that is, the position of the sample introduction valve 204 is switched back and forth about once even while the sample is being eluted into the detection unit is to reduce carryover.

This is the state in which the sample is present in the sample introduction valve 204 and the front and rear flow paths pipes when the position of the sample introduction valve 204 is switched to the position 2 for the first time (when the total time is 7 seconds). At that time, the sample is sandwiched in a slit (or a sliding surface, a connecting portion of a flow path pipe, or a plurality of the same) of the sample introduction valve 204. The slit is an extremely small gap.

Then, when the position of the sample introduction valve 204 is switched to the position 2 for the second time (when the total time is 19 seconds), the sample elutes from the slit of the sample introduction valve 204 and is fed to the cleaning valve 401. When the position of the sample introduction valve 204 is switched to the position 2 for the second time, the position of the cleaning valve 401 is the position 2. Therefore, the sample introduction valve 204, the cleaning valve 401, and the waste liquid are connected to one another, and thus the sample eluted from the slit is fed to the waste liquid. In other words, when the position of the sample introduction valve 204 is switched back and forth for the second time, the cleaning valve 401 is positioned at the position 2 behind the sample introduction valve 204, and thus the sample eluted from the slit of the sample introduction valve 204 is not fed to the separation column 403 and cannot be discarded. Due to the configuration and the analysis table configured to switch the position of the sample introduction valve 204 twice at appropriate timings during one analysis, a carryover can be further lowered as compared to that in the prior art.

(Detection in Detector 502, Data Processing (from 22 to 36 Seconds): Step S810)

Since the sample is eluted from the separation column 403 in the previous step S809 and the sample is introduced into the detector 502, quantizing process is performed at the detector 502. Hereinafter, quantizing methods will be described.

Components to be measured of known concentrations are analyzed by the detector 502 in advance. These components to be measured contain an internal standard material of a predetermined known concentration. Then, the detector 502 acquires a signal of m/z (mass/charge) derived from the component to be measured, the control unit 105 acquires a change of a signal intensity over time (mass chromatogram) regarding the acquired signal, and the control unit 105 calculates the peak area of the mass chromatogram. Similarly, the detector 502 acquires a signal of m/z (mass/charge) derived from the internal standard material, the control unit 105 acquires a change of a signal intensity over time (mass chromatogram), and the control unit 105 calculates the peak area of the mass chromatogram. Next, in the control unit 105, the concentration of the component to be measured is plotted on the X axis, the peak area of the component to be measured and the peak area ratio of the internal standard material are plotted on the Y axis, and a calibration curve is created. The calibration curve is created when the sensitivity or the mass axis of the detector 502 fluctuates during a calibration at the startup of the device. The term "fluctuation" means that a calibration result is greater than a threshold value stored in the control unit 105 in advance.

First, the detector 502 analyzes a sample with unknown concentration, and then the control unit 105 acquires a peak area ratio of a mass chromatogram. Then, based on a created calibration curve, a material concentration corresponding to the peak area of the mass chromatogram is determined. As an internal standard material, a stable isotope labeling material is employed for each component to be measured. In the present embodiment, the MS transition of testosterone, which is a component to be measured, is m/z=289.1/97.1, and the MS transition of testosterone d-3, which is an internal standard material, is m/z=292.1/97.1.

(Cleaning of Flow Path Pipe, Etc.: Step S812)

After completion of the elution (the total time is 22 seconds) in the previous step S811, as illustrated in FIG. 9, the position of each of the sample introduction valve 204 and the waste liquid valve 501 is switched to the position 1. On the other hand, the cleaning valve 401 and the elution valve 402 stay at the position 2. In this state, the flow path pipe, the separation column 403, and the valves are cleaned by using respective pumps. It is configured to perform cleaning for 13 seconds (total time: 36 seconds).

Specifically, in the sample introduction unit 101, the pump 201, the syringe valve 203, the sample introduction valve 204, the sample loop 210, and the needle 206 are connected to one another, the ports 2 and 5 of the syringe valve 203 are connected to each other, and the solution is fed from the pump 201. Therefore, cleaning is performed.

The flow path pipe between the sample introduction valve 204 and the cleaning valve 401 is cleaned by feeding a solution from the sample introduction pump 301.

The flow path pipe between the flushing valve 401 and the elution valve 402 is cleaned by feeding a solution from the cleaning pump 303.

The flow path pipe between the elution valve 402 and the waste liquid valve 501 and the separation column 403 are cleaned by feeding a solution from the elution pump 305.

In this regard, by minimizing a pipe length (volume) of a flow path pipe to be cleaned with one pump, cleaning may be performed efficiently within a short period of time. In other words, cleaning with high throughput can be realized.

Since the waste liquid valve 501 stays at the position 1 during cleaning, a solution to the detection unit 104 flows to a waste liquid via the waste liquid valve 501, and a solution after the separation column 403 is cleaned is not introduced to the detector 502. Therefore, contamination of the detector 502 is reduced. In other words, the frequency of maintenance of the detector 502 is reduced, and a test with high accuracy can be realized.

After steps S810 and S812 are completed, initialization is restarted as a process for analyzing a next sample.

Here, as described above, the solution mixing ratio of the cleaning pump 303 and the elution pump 305 during initialization is solution A:solution C=0:100. Furthermore, the position of the cleaning valve 401 during the initialization is the position 2, and the positions of the elution valve 402 and the waste liquid valve 501 are the position 1. In other words, the solution from the cleaning pump 303 flows through the cleaning valve 401, the elution valve 402, the separation column 403, and the waste liquid flow path pipe. The solution from the elution pump 305 flows through the elution valve 402, the waste liquid valve 501, and the waste liquid flow path. The solution mixing ratio of the cleaning pump 303 and the elution pump 305 and the positions of the cleaning valve 401, the elution valve 402, and the waste liquid valve 501 are maintained from the initialization to reception of a start signal by the valve unit (the total time is 7 seconds).

In the present embodiment, testosterone having high hydrophobicity is used as a component to be measured. When the ratio of an organic solvent in a solution is high, testosterone in the previous sample remaining after being adsorbed to the separation column 403 and the flow path pipe is cleaned. As described above, during movement of a needle (from 1 to 3 seconds) and introduction of a sample into a sample loop (from 3 to 7 seconds), testosterone remaining after being absorbed to the separation column 403 and flow path pipe connecting the cleaning valve 401 and the elution valve 402 is cleaned. In addition, the solution mixing ratio of the cleaning pump 303 and the elution pump 305 becomes solution A:solution C=100:0 after a needle is moved (after 3 seconds), but it takes about 3 seconds for changing a solution in a flow path, testosterone adsorbed to (remaining in) the separation column 403 and the flow path pipe is cleaned during the introduction of the sample (from 3 to 7 seconds) into the sample loop.

In the present embodiment, the type of the solution and the solution mixing ratio in the case of using testosterone as the component to be measured are illustrated, but appropriate changes may be made therein depending on components for analysis. Even when another component to be measured is used, since the cleaning valve 401 is disposed between the sample introduction valve 204 and the elution valve 402, the component to be measured absorbed to the separation column 403 and the flow path pipe can be cleaned during the movement of a needle (from 1 to 3 seconds) and the introduction of a sample into the sample loop (from 3 to 7 seconds), and thus the test time can be reduced and the test accuracy can be improved.

(Needle Cleaning)

Next, cleaning of the needle 206 will be described.

The cleaning of the needle 206 is performed immediately after introduction of a sample into the sample loop 210 with the syringe 202 moved to the lowermost position. First, as illustrated in FIG. 9, the needle 206 moves to the needle cleaning port 207, and the outside of the needle 206 is cleaned by a solution fed by the pump 201. The outside of the needle 206 is cleaned for 9 seconds (the total time: from 7 to 16 seconds).

Next, the position of the syringe valve 203 is switched, the port 5 and the port 3 of the syringe valve 203 are connected to each other, the syringe 202 moves to the uppermost position (initialization position), and the unnecessary sample remaining in the needle 206 is discharged. The sample is discharged for 6 seconds (total time: from 16 to 22 seconds).

Next, in the aforementioned step S812, the pump 201, the syringe valve 203, the sample introduction valve 204, the sample loop 210, and the needle 206 are connected to one another, the ports 2 and 5 of the syringe valve 203 are connected to each other, a solution is fed by the pump 201, and the needle is cleaned. As a result, the inside of the needle 206 is cleaned. The inside the needle 206 is cleaned for 13 seconds (the total time: from 22 to 36 seconds).

Next, effects of the present embodiment will be described.

The mass spectroscope 100 for quantifying an analyte according to the Embodiment 1 of the present invention described above includes the sample introduction unit 101 for introducing a sample into the device, the sample condensation unit 103 for processing the sample introduced into the device, the detection unit 104 for analyzing the sample treated by a treatment unit, and the control unit 105 for controlling the sample introduction unit 101, the sample condensation unit 103, and the detection unit 104. The sample introduction unit 101 includes the sample introduction valve 204, the sample condensation unit 103 includes the elution valve 402 and the cleaning valve 401, and the cleaning valve 401 is disposed between the sample introduction valve 204 and the elution valve 402.

As described above, in the prior art, cleaning for a certain period of time is necessary, and it is difficult to realize high throughput within 30 seconds. In addition, when priority is given to high throughput, cleaning may be insufficient, and thus a carryover may occur. However, in an analysis device of the present embodiment, since the cleaning valve 401 is disposed between the sample introduction valve 204 and the elution valve 402, by appropriately switching the cleaning valve 401, a cleaning operation can be performed in parallel at the timing other than the timing of the cleaning operation of the piping flow path. As a result, sufficient time for a cleaning operation can be secured, and thus cleaning can be performed with high throughput. Therefore, an analysis can be performed with high accuracy and high throughput.

Further, even while the sample introduction unit 101 is introducing a sample into the device, the control unit 105 performs a control for switching the cleaning valve 401 so as to clean the sample condensation unit 103. Therefore, the separation column 403 or the flow path pipe can be cleaned even while a sample is being introduced to the sample loop 210, and thus a highly accurate analysis can be performed with a sufficient cleaning operation.

Furthermore, when the sample is eluted from the sample concentrator 103 to the detector 104, the control unit 105 performs a control for switching the sample introduction valve 204 back and forth one time. Therefore, even when a six-way valve having a dead volume of a slit between ports or a sliding surface (although capacity thereof is very small) is used as the sample introduction valve 204, a sample remaining in the dead volume is cleaned without being carried over to a next analysis, and thus an analysis can be performed more accurately.

In addition, as the liquid feeding unit 102 including the cleaning pump 303 connected to the cleaning valve 401 is further provided, a cleaning liquid can be easily fed to the cleaning valve 401, and thus a cleaning operation can be smoothly performed with a high throughput.

Furthermore, as the liquid feeding unit 102 further includes the sample introduction pump 301 connected to the sample introduction valve 204 and the elution pump 305 connected to the elution valve 402, a pipe length (volume) of a flow path pipe to be cleaned with one pump can be minimized, and thus a cleaning operation can be efficiently performed within a short period of time. Therefore, a cleaning operation can be performed with a higher throughput.

Furthermore, the pipe length (volume) of the flow path pipe to be cleaned with one pump can also be minimized by further providing the waste liquid valve 501 between the detection unit 104 and the elution valve 402, and thus a cleaning operation can be efficiently performed within a short period of time. In addition, it becomes unnecessary to continuously feed an eluate to the detector 502, and thus a possibility of contamination of a sample analyzer as in PTL 1 due to continuous flow of an eluate to the sample analyzer can also be prevented.

Embodiment 2

An Embodiment 2 of a mass spectroscope according to the present invention will be described with reference to FIGS. 10 to 13. The same reference numerals are given to the same components as those of the Embodiment 1, and descriptions thereof are omitted.

FIGS. 10A and 10B are schematic views illustrating a flow path configuration of the mass spectroscope according to the present embodiment, FIGS. 11A and 11B are schematic views illustrating positions of a cleaning valves, FIGS. 12A and 12B are schematic views illustrating positions of an elution valve, and FIG. 13 is a time chart of a test.

In the mass spectroscope according to the Embodiment 2, the flow path pipe of a sample condensation unit 103A is different from that of the sample condensation unit 103 of the Embodiment 1. The device configuration of the sample condensation unit 103A different from that of the Embodiment 1 will be described with reference to FIG. 10.

As illustrated in FIG. 10, the sample condensation unit 103 A includes a cleaning valve 401A, an elution valve 402A, and a separation column 403A, which are connected to one another via a flow path pipe.

As illustrated in FIG. 10, similarly as the cleaning valve 401 of the Embodiment 1, the cleaning valve 401A is also a four-way valve having four ports and includes a valve case, a rotor seal, a case spacer, and a stator. A narrow groove is cut-formed in the rotor seal and, when an external signal is received, the rotor seal appropriately rotates and switches between a position 1 and a position 2, thereby changing a flow path. A port 1 of cleaning valve 401A is connected to a port 1 of the elution valve 402A, a port 2 is connected to the elution pump 305 of the liquid feeding unit 102, a port 3 is connected to a waste liquid port (not illustrated), and a port 4 is connected to the port 4 of sample introduction valve 204.

Flow path switching of the cleaning valve 401A will be described with reference to FIGS. 11A and 11B. As illustrated in FIG. 11A, when the cleaning valve 401A is positioned at a position 1, the port 1 and the port 4 are connected to each other, and the port 2 and the port 3 are connected to each other. As illustrated in FIG. 11B, when the cleaning valve 401A is positioned at a position 2, the port 1 and the port 2 are connected to each other, and the port 3 and the port 4 are connected to each other.

As illustrated in FIG. 10, similarly as the elution valve 402 of the Embodiment 1, the elution valve 402A is also a six-way valve having six ports and includes a valve case, a rotor seal, a case spacer, and a stator. A narrow groove is cut-formed in the rotor seal and, when an external signal is received, the rotor seal appropriately rotates and switches between a position 1 and a position 2, thereby changing a flow path. The port 1 of the elution valve 402A is connected to the port 1 of the cleaning valve 401A, a port 2 is connected to the port 4 of the waste liquid valve 501 of the detection unit 104, a port 3 and a port 6 are connected to the separation column 403A, a port 4 is connected to the cleaning pump 303 of the liquid feeding unit 102, and a port 5 is connected to a waste liquid port (not illustrated).

Flow path switching of the elution valve 402A will be described with reference to FIGS. 12A and 12B. As illustrated in FIG. 12A, when the elution valve 402A is positioned at a position 1, the port 1 and the port 6 are connected to each other, the port 2 and the port 3 are connected to each other, and the port 4 and the port 5 are connected to each other. As illustrated in FIG. 12B, when the elution valve 402A is positioned at a position 2, the port 1 and the port 2 are connected to each other, the port 3 and the port 4 are connected to each other, and the port 5 and the port 6 are connected to each other.

Similarly as the separation column 403 of the Embodiment 1, the separation column 403A is a column for separating a component to be measured and impurities. In the present embodiment, a normal phase column is used.

Next, regarding a test method, a device configuration different from that of the Embodiment 1 will be described with reference to FIG. 13.

The Embodiment 2 is identical to the Embodiment 1 from the start of an analysis until introduction of a sample from the separation column 403A (from 7 to 13 seconds).

(Cleaning of Separation Column 403A (from 13 to 16 Seconds))

After the sample is introduced into the separation column 403A, as illustrated in FIG. 13, the position of the elution valve 402A is switched from the position 1 to the position 2, and a solution A is fed to the separation column 403A from the cleaning pump 303 through the elution valve 402A. At this time, the solution A flows in a direction opposite to a direction in which the sample is introduced into the separation column 403A, and contaminants other than the component to be measured (testosterone in the present embodiment), such as phospholipids, salts, and the like, absorbed to the separation column 403 are cleaned. It is configured that the separation column 403A is cleaned for 3 seconds (total time: 16 seconds).

(Elution from Separation Column 403A (from 16 to 22 Seconds))

Next, as illustrated in FIG. 13, the positions of the cleaning valve 401A and the waste liquid valve 501 are switched from the position 1 to the position 2 and, at the same time, the position of the elution valve 402A is switched to the position 1. As a result, the elution pump 305, the separation column 403A, and the detector 502 are connected to one another via the cleaning valve 401A, the elution valve 402A, and the waste liquid valve 501. In the gradient program from the elution pump 305, the solution mixing ratio starts to be changed when the position of the elution valve 402A is switched to the position 2 (total time: 16 seconds), and a gradient program from the solution mixing ratio of solution A: solution C=100:0 (total time: 16 seconds) to the solution mixing ratio of solution A:solution C=0:100 (total time: from 21.9 to 22.0 seconds) is carried out. The solution from the elution pump 305 is fed to the separation column 403A in a direction identical to the direction in which the sample is introduced to the separation column 403A. It is configured that the elution of the sample occurs for 6 seconds (total time: 22 seconds).

Here, the solution mixing ratio of the cleaning pump 303 and the elution pump 305 during initialization is solution A:solution C=0:100. Furthermore, the position of the cleaning valve 401A during the initialization is the position 2, and the positions of the elution valve 402A and the waste liquid valve 501 are the position 1. That is, the solution from the elution pump 305 flows through the cleaning valve 401A, the elution valve 402A, the separation column 403A, the waste liquid valve 501, and the waste liquid flow path pipe. The solution from the cleaning pump 303 flows through the elution valve 402A and the waste liquid flow path. The solution mixing ratios of the cleaning pump 303 and the elution pump 305 and the positions of the cleaning valve 401A, the elution valve 402A, and the waste liquid valve 501 are maintained from the initialization until a start signal is received by a valve unit is received (the total time is 7 seconds). In other words, the solution from the elution pump 305 flows in the flow path pipe connecting the cleaning valve 401A, the elution valve 402A, the separation column 403A, the waste liquid valve 501, and the waste liquid.

In the present embodiment, testosterone having high hydrophobicity is used as a component to be measured. When the ratio of an organic solvent in a solution is high, testosterone in the previous sample remaining after being adsorbed to the separation column 403A and the flow path pipe is eluted and cleaned. As described above, during movement of a needle (from 1 to 3 seconds) and introduction of a sample into a sample loop (from 3 to 7 seconds), testosterone absorbed to the separation column 403A and flow path pipe connecting the cleaning valve 401A and the elution valve 402A is cleaned.

In the present embodiment, the type of the solution and the solution mixing ratio in the case of using testosterone as the component to be measured are illustrated, but appropriate changes may be made therein depending on components to be measured. Even when another component to be measured is used, the component to be measured absorbed to the separation column 403A and the flow path pipe can be cleaned during the movement of a needle (from 1 to 3 seconds) and the introduction of a sample into the sample loop (from 3 to 7 seconds), and thus the test time can be reduced and the test accuracy can be improved.

Other configurations/operations are substantially identical to that of the mass spectroscope 100 of the Embodiment 1 described above, and detailed descriptions thereof will be omitted.

Even in the mass spectroscope according to the Embodiment 2 of the present invention, effects substantially identical to those of the mass spectroscope 100 of the Embodiment 1 described above can be obtained.

<Others>

The present invention is not limited to the above-described embodiment and may include various modified examples. For example, the above-described embodiments have been described in detail to facilitate the understanding of the present invention and are not necessarily limited to those having all the configurations described above. Furthermore, a part of the configuration of one embodiment can be replaced by the configuration of another embodiment. Also, the configuration of another embodiment can be added to the configuration of one embodiment. Furthermore, the configurations of other embodiments can be added to, deleted from, and replace a part of the configuration of each embodiment.

For example, each of the above-described configurations, functions, treatment units, processing means, and the like can be realized by hardware, for example, by designing some or all of them as an integrated circuit or the like. In addition, each of the above-described configurations, functions, and the like can be realized by software as a processor interprets and executes programs realizing the respective functions. Data including programs, tables, files, and the like that realize respective functions can be stored in a storage device, such as a memory, a hard disk, an solid state drive (SSD), or a storage medium, such as an IC card, an SD card, and a DVD.

Also, control lines and data lines indicate those considered as necessary for explanation and all of the control lines and the data lines are not necessarily illustrated in actual products. In reality, it may be considered that almost all the structures are mutually connected.

REFERENCE SIGNS LIST

100: mass spectroscope
101: sample introduction unit
102: liquid feeding unit
103, 103A: sample condensation unit (treatment unit)
104: detection unit
105: control unit
201: pump
202: syringe
203: syringe valve
204: sample introduction valve
205: sample rack
206: needle
207: needle cleaning port
208: waste liquid port
209: reagent bottle
210: sample loop
211: sample vial
301: sample introduction pump
302A, 302C, 304A, 304C, 306A, 306C: reagent bottle
303: cleaning pump
305: elution pump
401, 401A: cleaning valve
402, 402A: elution valve
403, 403A: separation column
501: waste liquid valve
502: detector

The invention claimed is:

1. An analysis device for quantifying an analyte, comprising:
a sample introduction unit configured to introduce a sample into the analysis device;
a treatment unit configured to treat the sample introduced into the analysis device at the sample introduction unit;
a detection unit configured to analyze the sample treated by the treatment unit; and
a control unit configured to control the sample introduction unit, the treatment unit, and the detection unit, wherein
the sample introduction unit includes a sample introduction valve,
the treatment unit includes an elution valve and a cleaning valve,
the sample introduction valve feeds the sample to the elution valve through the cleaning valve,
the detection unit analyzes the sample which flew thereto via the sample introduction valve, the cleaning valve, and the elution valve in the order stated,
the control unit performs a control for switching positions of the cleaning valve and the elution valve so as to be directly connected to each other via a flow path pipe, such that only the flow path pipe is disposed between the cleaning valve and the elution valve, for cleaning the treatment unit even while the sample is being introduced into the analysis device by the sample introduction unit, and while the sample is being eluted from the treatment unit to the detection unit, the control unit performs a control for switching the position of the sample introduction valve back and forth one time.

2. The analysis device according to claim 1, further comprising:

a liquid feeding unit including a cleaning pump connected to the cleaning valve.

3. The analysis device according to claim 2, wherein the liquid feeding unit further includes: a sample introduction pump connected to the sample introduction valve and an elution pump connected to the elution valve.

4. The analysis device according to claim 3, wherein the treatment unit further includes a separation column, the detection unit further includes a waste liquid valve, the elution valve is connected to the separation column and the waste liquid valve, the sample introduction pump feeds a solution to a flow path pipe between the sample introduction valve and the cleaning valve to clean the flow path pipe, the cleaning pump feeds a solution to a flow path pipe between the cleaning valve and the elution valve to clean the flow path pipe, and the elution pump feeds a solution to a flow path pipe between the elution valve and the waste liquid valve and the separation column to clean the flow path pipe and the separation column.

5. The analysis device according to claim 1, further comprising:

a waste liquid valve between the detection unit and the elution valve.

6. The analysis device according to claim 1, further comprising:

a liquid feeding unit including a cleaning pump connected to the cleaning valve, a sample introduction pump connected to the sample introduction valve, and an elution pump connected to the elution valve, wherein the sample introduction unit further includes a syringe valve, a needle, and a sample loop, the treatment unit further includes a separation column, the detection unit further includes a waste liquid valve and a detector, the sample introduction valve is connected to the sample introduction pump, the cleaning valve, the sample loop, the syringe valve, and the needle, the cleaning valve is connected to the elution valve, the cleaning pump, the sample introduction valve, and a waste liquid flow path, and the elution valve is connected to the cleaning valve, the waste liquid valve, the separation column, the elution pump, and the waste liquid flow path.

7. The analysis device according to claim 1, further comprising:

a liquid feeding unit including a cleaning pump connected to the cleaning valve, a sample introduction pump connected to the sample introduction valve, and an elution pump connected to the elution valve, wherein the sample introduction unit further includes a syringe valve, a needle, and a sample loop, the treatment unit further includes a separation column, the detection unit further includes a waste liquid valve and a detector, the sample introduction valve is connected to the sample introduction pump, the cleaning valve, the sample loop, the syringe valve, and the needle, the cleaning valve is connected to the elution valve, the elution pump, the sample introduction valve, and a waste liquid flow path, and the elution valve is connected to the cleaning valve, the waste liquid valve, the separation column, the cleaning pump, and the waste liquid flow path.

\* \* \* \* \*